United States Patent
Guida et al.

(10) Patent No.: US 8,590,385 B2
(45) Date of Patent: Nov. 26, 2013

(54) HIGH PRESSURE FIBER OPTIC SENSOR SYSTEM

(75) Inventors: Renato Guida, Wynantskill, NY (US); Hua Xia, Altamont, NY (US); Boon K. Lee, Clifton Park, NY (US); Sachin N. Dekate, Niskayuna, NY (US)

(73) Assignee: General Electric Company, Niskayuana, NY (US)

( * ) Notice: Subject to any disclaimer, the term of this patent is extended or adjusted under 35 U.S.C. 154(b) by 169 days.

(21) Appl. No.: 13/316,842

(22) Filed: Dec. 12, 2011

(65) Prior Publication Data
US 2013/0145852 A1     Jun. 13, 2013

(51) Int. Cl.
G01L 7/06     (2006.01)
G01L 9/00     (2006.01)

(52) U.S. Cl.
USPC .................. 73/705; 250/230; 250/231.19

(58) Field of Classification Search
None
See application file for complete search history.

(56) References Cited

U.S. PATENT DOCUMENTS

| | | | |
|---|---|---|---|
| 5,844,667 A | 12/1998 | Maron | |
| 6,016,702 A * | 1/2000 | Maron | 73/705 |
| 6,278,811 B1 | 8/2001 | Hay et al. | |
| 6,450,037 B1 | 9/2002 | McGuinn et al. | |
| 6,820,489 B2 * | 11/2004 | Fernald et al. | 73/705 |
| 6,955,085 B2 | 10/2005 | Jones et al. | |
| 7,047,816 B2 | 5/2006 | Jones et al. | |
| 7,308,165 B2 | 12/2007 | Arias Vidal et al. | |
| 7,684,656 B2 * | 3/2010 | Chen | 385/12 |
| 7,912,334 B2 | 3/2011 | Xia et al. | |
| 8,103,135 B2 * | 1/2012 | Head | 385/12 |
| 8,176,790 B2 * | 5/2012 | Birch et al. | 73/705 |
| 2002/0154860 A1 * | 10/2002 | Fernald et al. | 385/37 |
| 2002/0194917 A1 * | 12/2002 | Fernald et al. | 73/705 |
| 2004/0129083 A1 * | 7/2004 | Fernald et al. | 73/705 |
| 2004/0182166 A1 * | 9/2004 | Jones et al. | 73/729.1 |
| 2007/0041019 A1 * | 2/2007 | Schmidt | 356/480 |
| 2008/0085073 A1 * | 4/2008 | Jones | 385/12 |

OTHER PUBLICATIONS

Liu et al., "Research of Pressure Sensor Based on the Fiber Bragg Grating for Permanent Downwell Monitoring Application", Proc. of SPIE, vol. 5579, pp. 235-241, 2004.

Dongcao et al.,"High-sensitivity Fiber Bragg Grating Pressure Sensor Using Metal Bellows", Spie Digital Library vol. 48, Issue 03, Mar. 23, 2009.

* cited by examiner

*Primary Examiner* — Andre Allen
(74) *Attorney, Agent, or Firm* — Andrew J. Caruso

(57) ABSTRACT

The present application provides a fiber optic sensor system. The fiber optic sensor system may include a small diameter bellows, a large diameter bellows, and a fiber optic pressure sensor attached to the small diameter bellows. Contraction of the large diameter bellows under an applied pressure may cause the small diameter bellows to expand such that the fiber optic pressure sensor may measure the applied pressure.

20 Claims, 5 Drawing Sheets

HIGH PRESSURE FIBER OPTIC SENSOR SYSTEM

FEDERAL RESEARCH STATEMENT

This invention was made with Government support under Contract No. DE-EE0002787, awarded by the U.S. Department of Energy (DOE). The Government has certain rights in this invention.

TECHNICAL FIELD

The present application and the resultant patent relate generally to fiber optic sensor systems and more particularly relate to a fiber optic sensor system for use in harsh environments such as geothermal and in the oil and gas industry for monitoring down hole parameters.

BACKGROUND OF THE INVENTION

Fiber Bragg gratings may be wavelength multiplexed along one fiber so as to be useful for measurements of strain and temperature. Specifically, the fiber Bragg gratings may be used as a pressure-temperature sensor by measuring the shift in Bragg wavelength caused by a change in hydrostatic pressure or a change in temperature. Fiber Bragg grating sensors thus may be used for multipoint temperature profile measurements because of low mass, low specific heat, multiplexing, multipoint distribution, and electromagnetic interference immunity. Moreover, the fiber Bragg grating sensors provide a simple sensor design with small dimensions, good reproducibility, and long term stability.

Fiber Bragg grating sensors are widely used in the oil and gas industry for monitoring down hole parameters such as pressure, temperature, hydrocarbon flow, and seismic status. Although such fiber Bragg grating sensors are highly accurate, the harsh environment in which such are typically used eventually may compromise the operation of such sensors There is thus a desire for an improved high pressure fiber optic sensor and system such as a fiber Bragg grating sensor for use with geothermal parameters, down hole parameters, and other uses in harsh environments. Preferably such an improved high pressure fiber optic sensor and system may be largely immune to such harsh conditions over an extended period of time.

SUMMARY OF THE INVENTION

The present application and the resultant patent thus provide a fiber optic sensor system. The fiber optic sensor system may include a small diameter bellows, a large diameter bellows, and a fiber optic pressure sensor attached to the small diameter bellows. Contraction of the large diameter bellows under an applied pressure may cause the small diameter bellows to expand such that the fiber optic pressure sensor may measure the applied pressure.

The present application and the resultant patent further provide a method of measuring pressure with a fiber optic sensor system. The method may include the steps of positioning a large diameter bellows and a small diameter bellows in a fixed enclosure, attaching a pressure sensor with fiber Bragg gratings to the small diameter bellows, applying a pressure to the large diameter bellows, contracting the large diameter bellows with the applied pressure, expanding the small diameter bellows by the contracting large diameter bellows, and measuring the expansion of the small diameter bellows to determine the applied pressure.

The present application and the resultant patent further provide a fiber optic sensor system. The fiber optic sensor system may include a cable, a number of passive sensors, and an active sensor attached to the cable. The active sensor may include a small diameter bellows, a large diameter bellows, and a fiber optic pressure sensor attached to the small diameter bellows.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
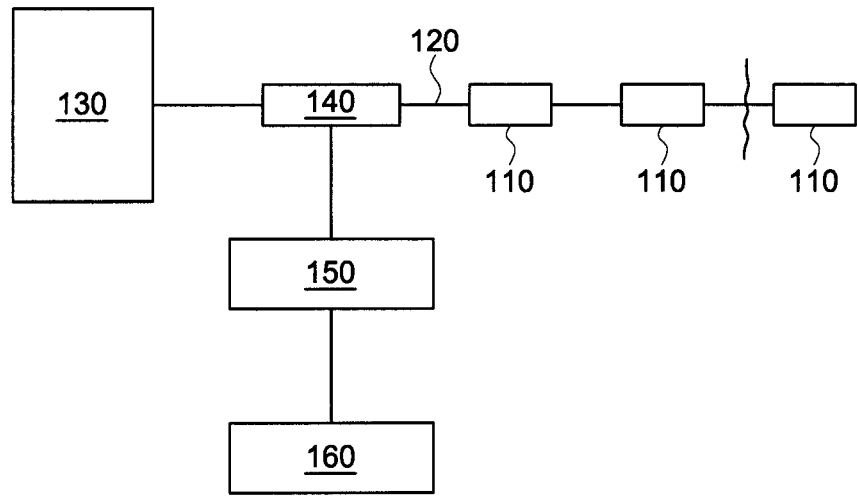
FIG. 1 is a schematic diagram of a high pressure fiber optic sensor system as may be described herein.

Referring now to the drawings, in which like numerals refer to like elements throughout the several views, FIG. 1 shows a schematic diagram of a fiber optic sensor system 100 as may be described herein. Generally described, the fiber optic sensor system 100 may include a number of sensors 110 attached to a fiber optic cable 120. Any number of sensors 110 may be used with a cable 120 of any length. As described above, the fiber optic sensor system 100 may be used in harsh environments such as geothermal, down hole, and the like. The sensors 110 may be connected in series to extend the range to be monitored.

The fiber optic sensor system 100 may include a light source 130. The light source 130 may be configured to illuminate the fiber optic cable 120 to facilitate the generation of reflected signals corresponding to a grating period of the cable 120. The fiber optic sensor system 100 also may include an optical coupler 140. The optical coupler 140 may manage incoming light from the light source 130 and reflected signals from the cable 120. The optical coupler 140 may direct the signals to a detector system 150. The detector system 150 may receive the optical signals and analyze the information imbedded therein with various hardware and software components. For example, an optical spectral analyzer and the like may be used. The information developed by the detector system 150 may be communicated to an output 160 such as a display or a wireless communication device. Other components and other configurations also may be used herein.

Figure 2:
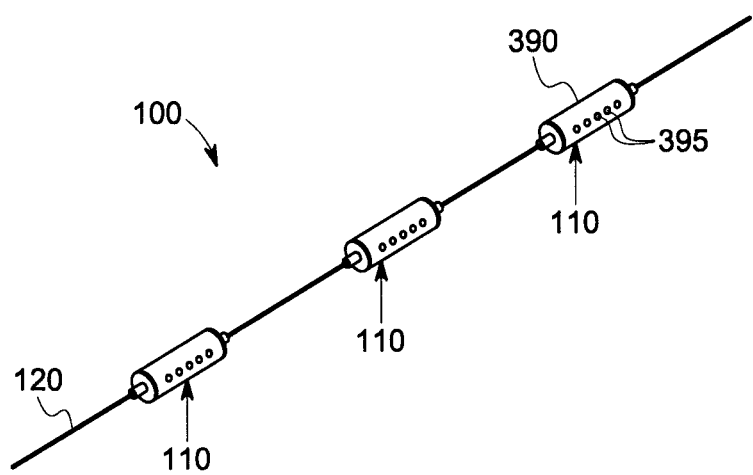
FIG. 2 is a perspective view of a number of sensors attached to a fiber optic cable of the high pressure fiber optic sensor system of FIG. 1.

FIG. 2 shows a number of the sensors 110 positioned on the fiber optic cable 120. As will be described in more details below, the cable 120 may include one or more optical fibers 170 with a number of fiber Bragg gratings 180 inscribed therein. Any number of the optical fibers 170 and the fiber Bragg gratings 180 may be used and may be enclosed in an outer sheath and the like. The fiber Bragg gratings 180 may operate in pressure ranges from atmosphere to about 6 kpsi or higher and temperature ranges of up to about 400 degrees Celsius or higher. Other components and other configurations may be used herein.

Figure 3:
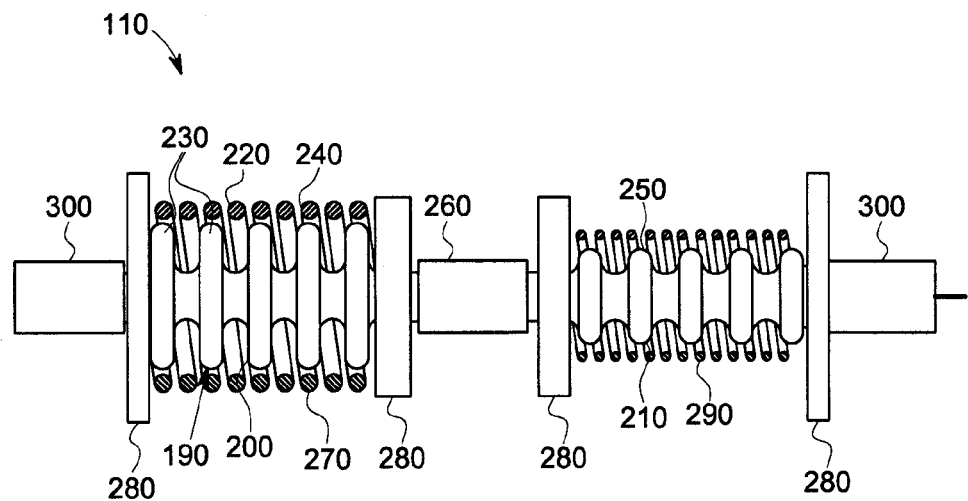
FIG. 3 is a partial side view of an example of a sensor as may be described herein.

FIG. 3 shows an example of the sensor 110. The sensor 100 may include a number of bellows 190. In this example, a large diameter bellows 200 and a small diameter bellows 210 are shown. As is known, a bellows 190 includes a tube 220 and a number of convolutions 230 extending therefrom. The bellows 190 may stretch or collapse if almost any force is exerted thereon in an axial direction but may require a very high force or pressure to cause compression in a radial direction. Moreover, the shrinkage caused by the collapse of the bellows 190 is a function of the applied pressure such that measuring the shrinkage or collapse of the bellows 190 may be used to determine the pressure.

The optical fiber 170 with the fiber Bragg gratings 180, however, are well suited to measure tension for elongation but generally not well suited to measure compression. As a result, the sensor 110 described herein uses the combination of the large diameter bellows 200 and the small diameter bellows 210. The large diameter bellows 200 and the small diameter bellows 210 may be joined by a sleeve 260, enclosed, and fixed in place about the extremities. As is shown, the convolutions 130 of the large diameter bellows 200 have a larger exposed area 240 than an exposed area 250 of the convolutions 230 of the small diameter bellows 210. If the bellows 200, 210 are then subject to pressure, the exposed area 240 of the convolutions 230 of the large diameter bellows 200 will be subject to a larger compressive force than that on the small diameter bellows 210. As a result, the convolutions 230 of large diameter bellows 200 will compress such that the convolutions 230 of the small diameter bellows 210 must expand so as to compensate for the total fixed length. As described above, this elongation of the small diameter bellows 210 may be related to the applied pressure. The elongation thus may be used to determine the applied pressure via the optical fiber 170 with the fiber Bragg gratings 180 acting as a pressure sensor.

In order to compensate for a lack of elasticity in the bellows 190, one or more springs or other types of elastic members may be used herein. A large diameter spring 270 may enclose the convolutions 230 of the large diameter bellows 200. The large diameter spring 270 may be positioned between a pair of end plates 280. The end plates 280 may be fixed via welding and the like to the large diameter bellows 200. The large diameter spring 270 ensures that the large diameter bellows 200 returns to its original position once the pressure is removed. A small diameter spring 290 also may be positioned about the convolutions 230 of the small diameter bellows 210. The small diameter spring 290 also may be fixed between a pair of the end plates 280. The small diameter spring 290 may provide a faster response to the small diameter bellows 210 by avoiding any type of permanent deformation. Additional sleeves or feed throughs 300 may be positioned on both ends of the sensor 110. Other components and other configurations may be used herein.

Figure 4:
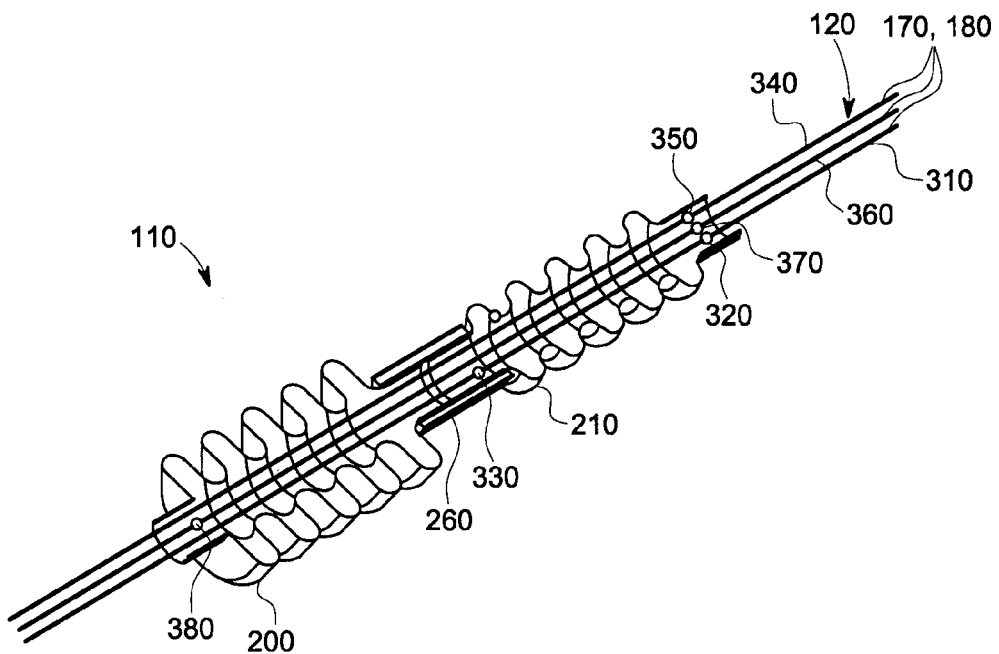
FIG. 4 is a further partial side view of the sensor of FIG. 3.

FIG. 4 shows a portion of the sensor 110 with a number of the optical fibers 170 extending therethrough. A first optical fiber 170 acts as a pressure sensor 310. The pressure sensor 310 may have a first attachment point 320 and a second attachment point 330 within the small diameter bellows 210. The attachment points 320, 330 may vary. Any elongation in the length of the small diameter bellows 210 will produce a proportional stress variation in the pressure sensor 310 that can be measured and correlated to the applied pressure. The pressure sensor 310 should be temperature compensated because the pressure sensor 310 generally cannot discriminate between temperature induced stress and pressure induced stress.

As such, a second optical fiber 170 may be used as a temperature sensor 340. The temperature sensor 340 may have one attachment point 350 about the small diameter bellows 210 and may be unattached on the other end. The attachment point 350 may vary. The temperature sensor 340 thus is not subject to any stress related to pressure or material thermal deformation and the like.

A third optical fiber 170 may be used as a calibration sensor 360. The calibration sensor 360 may have a first attachment point 370 at the beginning of the small diameter bellows 210 and a second attachment point 380 at the end of the large diameter bellows 200. The attachment points 370, 380 may vary. The calibration sensor 360 thus may measure the total length of variation of the sensor 110 as a whole that may be induced by pressure and/or temperature. This value may be used for fine compensation and calibration of the sensor 110. Other components and other configurations may be used herein.

The sensor 110 also may include an outer enclosure 390. The outer enclosure 390 may be made out of any material with sufficient strength to resist deformation in the desired operating pressure range. The outer enclosure 390 may have a number of apertures 395 therein. Other components and other configurations may be used herein.

The sensor 110 of the fiber optic sensor system 100 described herein thus may be relatively low in cost and compact in size. The sensor 110 requires no external power so as to eliminate the need for multiple cables. The sensor 110 may measure both temperature and pressure. The sensor 110 may be used in a serial configuration so as to measure multiple points with one set of fibers such that it is versatile for various ranges of pressure with heightened sensitivity. The sensor 110 may be custom tuned for various pressure ranges.

Figure 5:
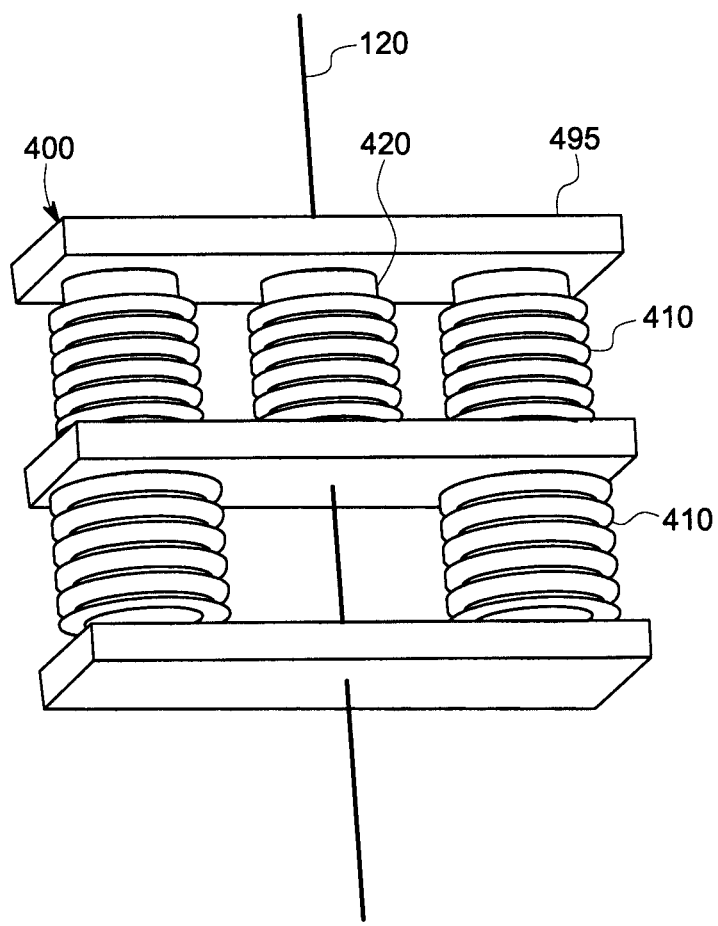
FIG. 5 is a perspective view of an example of a further embodiment of a sensor system as may be described herein.
Figure 6:
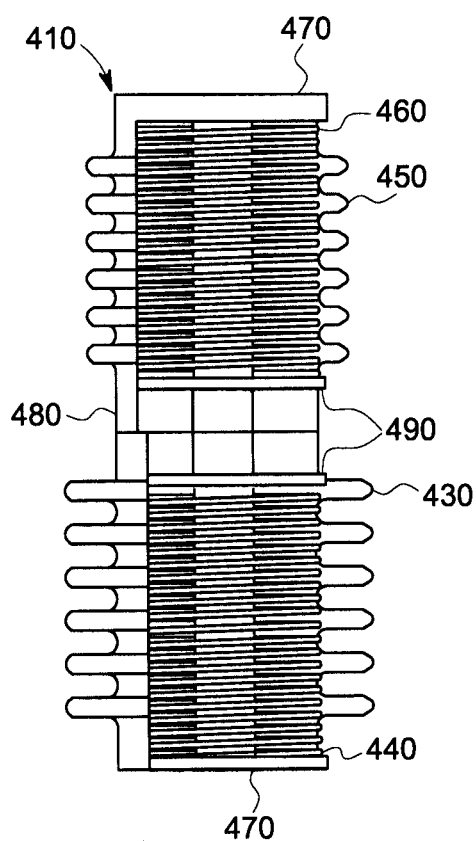
FIG. 6 is a side cross-sectional view of a portion of the sensor system of FIG. 5.

FIG. 5 shows an example of an alternative embodiment of a sensor system 400 as may be described herein. In this example, a number of passive sensors 410 may be used with an active sensor 420. As is shown in FIG. 6, the passive sensors 410 may be completely sealed. Each of the passive sensor 410 may include a large diameter bellows enclosed by a large diameter spring 440 and a small diameter bellows 450 enclosed by a small diameter spring 460. The large diameter bellows 430 and the small diameter bellows 450 may be welded or otherwise affixed and/or they may be fabricated in one piece. A pair of end plates 470 may be welded or otherwise affixed to the bellows 430, 450. A rod 480 may extend through the bellows 430, 450 and also may be welded or otherwise affixed to the end plates 470. A pair of spring plates 490 also may be welded or otherwise affixed to the bellows 430, 450 so as to keep the springs 440, 460 with the proper bellows without interfering with the rod 480. The active sensor 420 may be similar in design but with the optical fibers 170 attached in a manner similar to that described above. These sensors 410, 420 are completely enclosed so as to accommodate even harsher environments. Other configurations and other components may be used herein.

Referring again to FIG. 5, the sensor system 400 may include a number of the passive sensors 410 and an active sensor 420 mounted on a number of plates 495. The active sensor 420 must follow the length variation of the passive sensors 410 because the sensors 410, 420 are mechanically attached by means of the plates 495. Other components and other configurations may be used herein.

Figure 7:
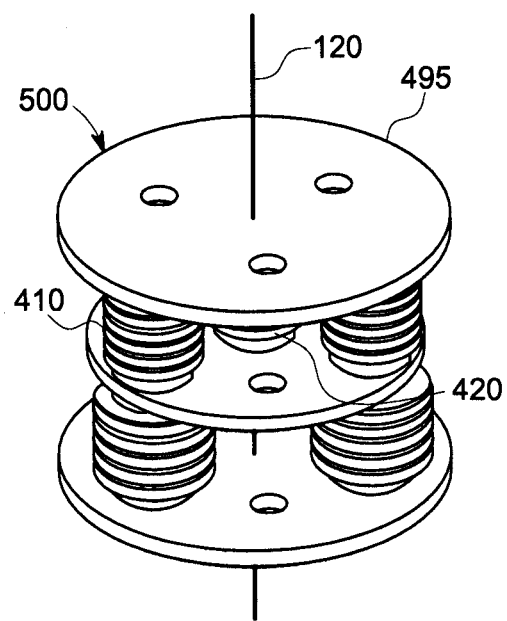
FIG. 7 is a perspective view of an example of a further embodiment of a sensor system as may be described herein.
Figure 8:
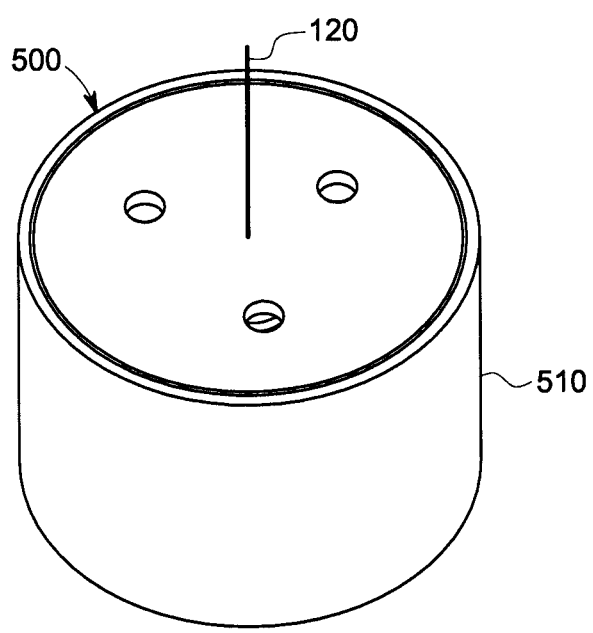
FIG. 8 is a further perspective view of the sensor system of FIG. 7.

FIG. 7 and FIG. 8 show a further embodiment of a sensor system 500. In this example, the sensor system 500 may includes a number of passive sensors 410 and an active sensor 420 positioned on a number of the plates 495. In this configuration, the passive sensors 410 may be positioned symmetrically for increased stability. An outer enclosure 510 also may be used for durability and ease of handling. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A fiber optic sensor system, comprising:
   a small diameter bellows;
   a large diameter bellows; and
   a fiber optic pressure sensor attached to the small diameter bellows;
   wherein contraction of the large diameter bellows under an applied pressure causes the small diameter bellows to expand such that the fiber optic pressure sensor measures the applied pressure.

2. The fiber optic sensor system of claim 1, wherein the fiber optic pressure sensor comprises fiber Bragg gratings.

3. The fiber optic sensor system of claim 1, further comprising a pair of end plates affixed to the small diameter bellows and the large diameter bellows.

4. The fiber optic sensor system of claim 1, further comprising a large diameter spring positioned about the large diameter bellows.

5. The fiber optic sensor system of claim 1, further comprising a small diameter spring positioned about the small diameter bellows.

6. The fiber optic sensor system of claim 1, wherein the fiber optic pressure sensor comprises a first attachment point and a second attachment point about the small diameter bellows.

7. The fiber optic sensor system of claim 1, further comprising a fiber optic temperature sensor.

8. The fiber optic sensor system of claim 7, wherein the fiber optic temperature sensor comprises an attachment point about the small diameter bellows or the large diameter bellows.

9. The fiber optic sensor system of claim 1, further comprising a fiber optic calibration sensor.

10. The fiber optic sensor system of claim 9, wherein the fiber optic calibration sensor comprises a first attachment point about the small diameter bellows and a second attachment point about the large diameter bellows.

11. The fiber optic sensor system of claim 1, further comprising an outer enclosure.

12. The fiber optic sensor system of claim 1, further comprising a cable in communication the fiber optic pressure sensor.

13. The fiber optic sensor system of claim 12, further comprising a light source in communication with the cable.

14. The fiber optic sensor system of claim 12, further comprising a detector system in communication with the cable.

15. A method of measuring pressure with a fiber optic sensor system, comprising:
    positioning a large diameter bellows and a small diameter bellows in a fixed enclosure;
    attaching a pressure sensor with fiber Bragg gratings to the small diameter bellows;
    applying a pressure to the large diameter bellows;
    contracting the large diameter bellows with the applied pressure;
    expanding the small diameter bellows by the contracting large diameter bellows; and
    measuring the expansion of the small diameter bellows to determine the applied pressure.

16. A fiber optic sensor system, comprising:
    a cable;
    a plurality of passive sensors; and
    an active sensor attached to the cable;
    the active sensor comprising a small diameter bellows, a large diameter bellows, and a fiber optic pressure sensor attached to the small diameter bellows.

17. The fiber optic sensor system of claim 16, wherein contraction of the large diameter bellows under an applied pressure causes the small diameter bellows to expand such that the fiber optic pressure sensor measures the applied pressure.

18. The fiber optic sensor system of claim 16, wherein the active sensor comprises a temperature sensor.

19. The fiber optic sensor system of claim 16, further comprising one or more plates positioned between one or more of the plurality of passive sensors.

20. The fiber optic sensor system of claim 16, further comprising an enclosure about the plurality of passive sensors and the active sensor.

\* \* \* \* \*